Figures 1, 2:
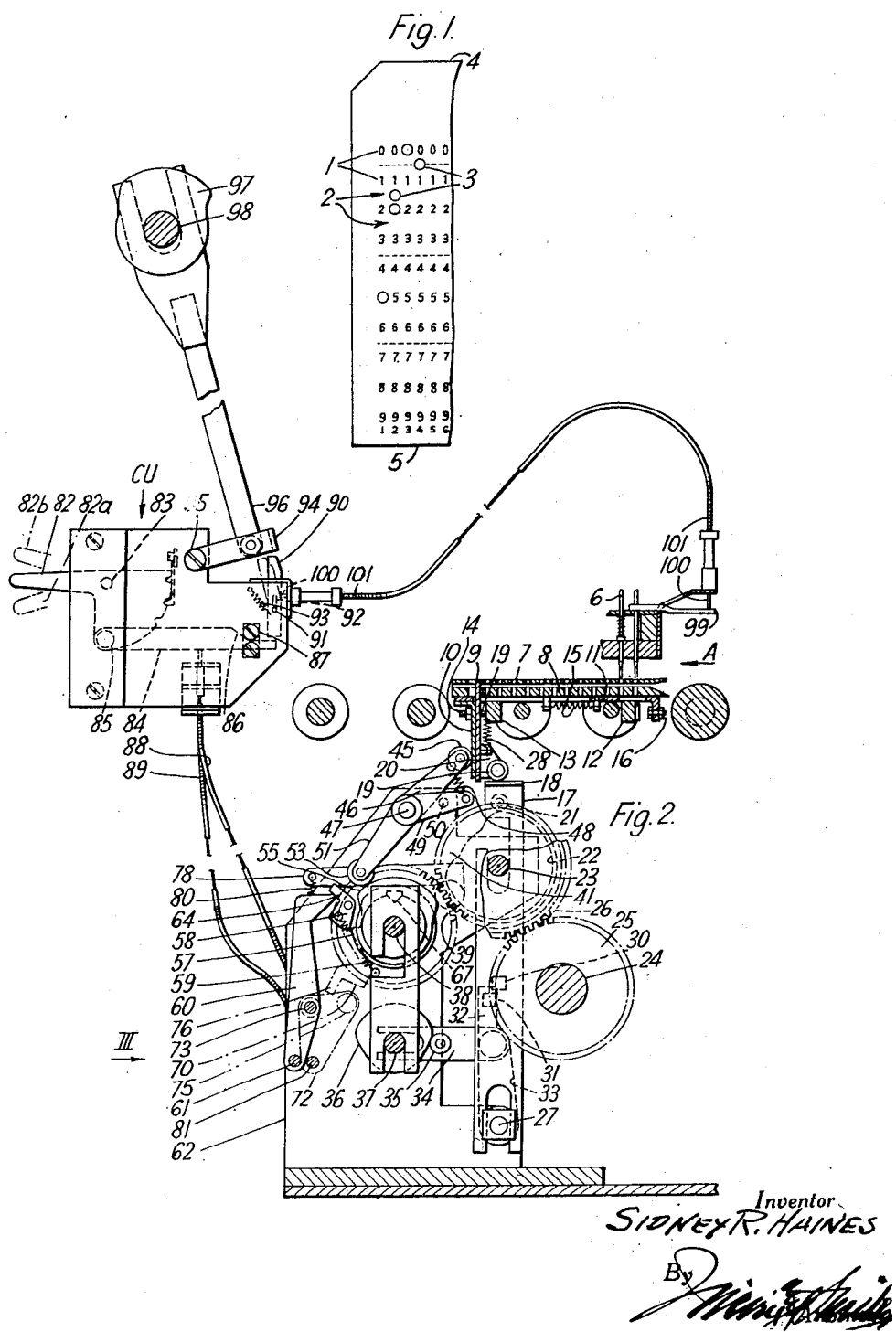

May 7, 1957  S. R. HAINES  2,791,376
RECORD CARD CONTROLLED STATISTICAL MACHINES
Filed May 28, 1954  3 Sheets-Sheet 1

Inventor
SIDNEY R. HAINES
By

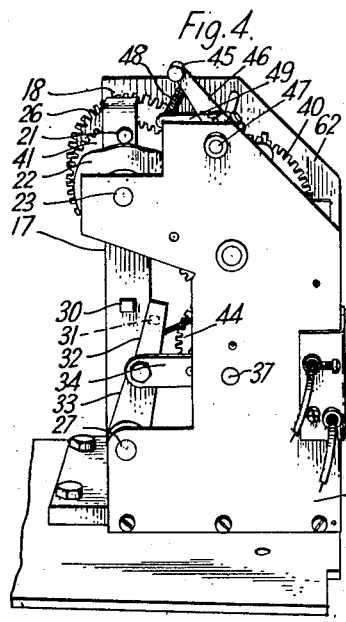
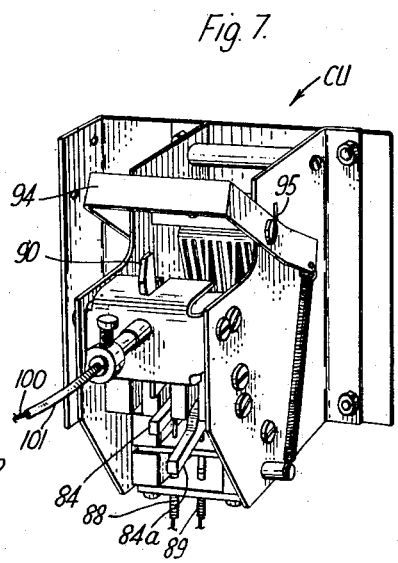
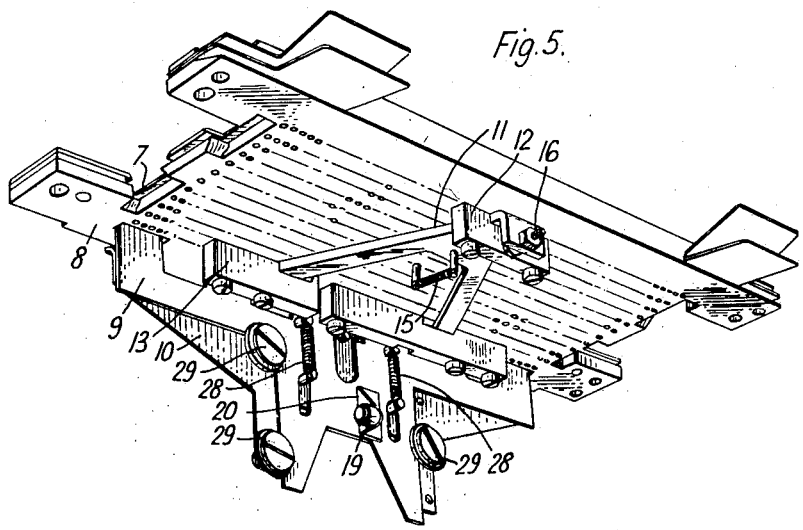

May 7, 1957 S. R. HAINES 2,791,376
RECORD CARD CONTROLLED STATISTICAL MACHINES
Filed May 28, 1954 3 Sheets-Sheet 3

Inventor
SIDNEY R. HAINES

United States Patent Office 2,791,376
Patented May 7, 1957

2,791,376

RECORD CARD CONTROLLED STATISTICAL MACHINES

Sidney Robert Haines, West Norwood, London, England, assignor to Powers-Samas Accounting Machines Limited, London, England, a British company Application May 28, 1954, Serial No. 433,115

Claims priority, application Great Britain July 3, 1953

24 Claims. (Cl. 235—61.11)

This invention relates to record card controlled statistical machines and in particular to apparatus for arresting a record card in sensing relation with a sensing device.

As is well understood, data is recorded on a record card, usually by perforations or marks, in vertical columns and horizontal rows and to increase the capacity of the card, the spaces between horizontal rows are sometimes employed for the recording of data. When a card is so used the row positions are known in the art respectively as "normal" and "interstage" and sensing for data recorded therein is effected during different sensing operations.

It is often required, when using cards having data recorded in normal and interstage positions, to sense the cards by a single sensing device during one passage of the card through the machine and heretofore this has been effected by the provision of two independently operable card stops arranged to arrest the card in relation to the sensing device, one such stop arresting the card for the sensing of normal positions and the other arresting the card for the sensing of interstage positions.

It is a main object of the present invention to provide apparatus for arresting a record card in sensing relation with a sensing device for the successive sensing of normal and interstage positions, during one passage of the card through the machine which apparatus employs a single card stop.

A further object of the invention is to provide apparatus for arresting a record card in sensing relation with a sensing device for the successive sensing of data-indicating positions located in different non-overlapping card areas considered from top to bottom of a card, during one passage of the card through the machine which apparatus employs a single card stop.

A further object of the invention is to provide that the card stop is selectively positionable either manually or under card control, and it is also an object of the invention to provide that the card stop be capable of locating relative to the sensing device a card the normal trailing edge of which is fed to the sensing device in precedence to its normal leading edge, location of the card by the stop being such that the card is first arrested for the sensing of normal positions and is then moved rearwards of the direction in which it is fed through the machine to the position at which the interstage positions can be sensed.

According to the present invention apparatus for arresting record cards in positions of sensing thereof comprises a sensing device, a card stop supported for movement into and out of the path of cards and for movement lengthwise of said path, card stop interposing means to move the card stop into and out of a card arresting position thereof, and card stop positioning means selectively operable to move the card stop lengthwise of said path to a predetermined position thereof relative to the sensing device.

Figure 3:
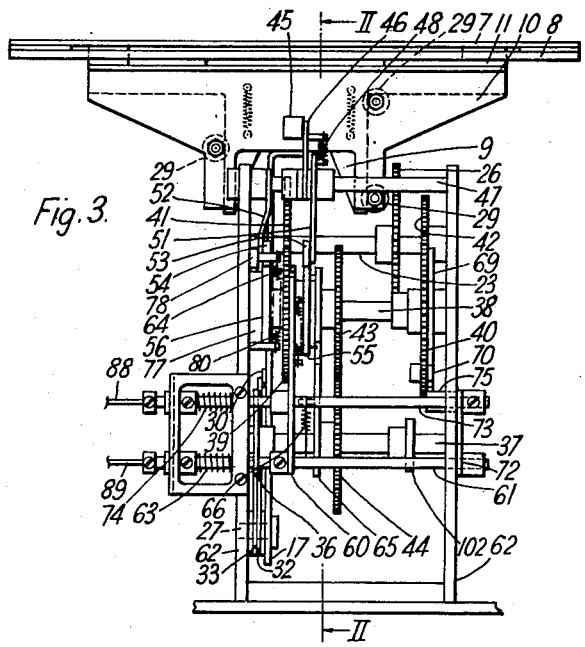
Figure 6:
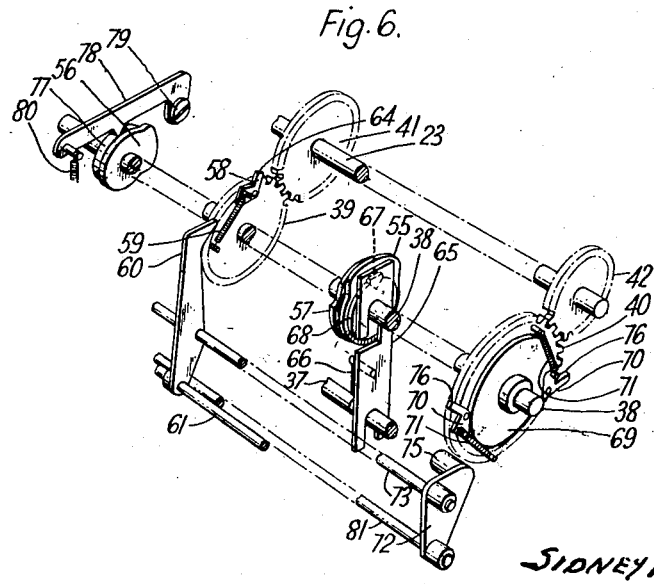

In order that the invention may be clearly understood one embodiment thereof will now be described, by way of example, with reference to the accompanying diagrammatic drawings in which:

Fig. 1 illustrates a part of a record card,

Fig. 2 is a side view of apparatus according to the present invention and is partly in section on line II—II, Fig. 3, Fig. 3 is an end elevation of a part of the apparatus shown in Fig. 2, the elevation being taken in the direction of arrow III, Fig. 2, Fig. 4 is a pictorial elevation looking in the direction tion of arrow IV, Fig. 3, Fig. 5 is a pictorial view of a part of the card stop apparatus, Fig. 6 is a partly exploded pictorial view of control mechanism co-operating with the card stop, and Fig. 7 is a pictorial view of a part of the mechanism illustrated in Fig. 2.

Referring to the drawings, Fig. 1 illustrates a portion of a record card having vertical columns and horizontal rows in which data can be recorded and, in Fig. 1, data is shown as being recorded by perforations formed in the card. The horizontal row positions 1 are the normal row positions on the card and from Fig. 1 it will be seen that between these row positions are spaces 2 which are utilised for interstage row positions as is shown by the perforations 3.

When a card is fed into a machine the normal leading edge of the card is the edge 4 thereof and the normal trailing edge is the edge 5. It will be understood that when, as is usual, the card is fed with its normal leading edge in advance of the trailing edge the normal row positions are presented first to the sensing device and when the interstage positions on the card are next to be sensed the normal card stop releases the card so that it is advanced through the machine to be arrested by a second or interstage card stop which arrests the card with the interstage positions thereof in sensing relation with the sensing device. In some instances, however, it is necessary that the card be fed into the machine with the normal trailing edge 5 in advance of the normal leading edge 4. When the card is fed in this manner it will be readily understood that the interstage rows would normally be presented first for sensing whereas it is, in all instances, desired that the first sensing be of normal rows. The apparatus about to be described provides a means whereby, when the card is fed through the machine with the normal trailing edge 5 in advance of the normal leading edge 4, the correct sensing sequence, that is first normal rows and the interstage rows, can be maintained.

The apparatus described herein is assumed to be for use with a sensing device of known construction and including sensing pins 6, Fig. 2, arranged to sense for data-indicating perforations in cards presented for sensing. The cards are fed to the sensing device in the direction of the arrow A, Fig. 2, and are delivered to a card chamber which consists, in known manner, of an upper plate 7 and a lower plate 8. The plates 7 and 8, as can be seen from Fig. 2, are provided with perforations, one for each card index position, and through which the sensing pins 6 can pass.

Co-operating with the card chamber is a card stop 9, Figs. 2 and 5, to arrest a card in position for sensing by the pins 6, the card being supported for movement into and out of the path of cards delivered to the sensing position, and for movement lengthwise of the path to permit a card to be arrested in either of two sensing positions thereof relative to the sensing pins 6. The card stop 9 is supported by a support 10 movable with a slide 11 guided for lengthwise movement by stationary guide members 12, 13 secured to the underside of the lower plate 8. As shown in Fig. 2 the card stop 9 is in the second position thereof in which position it is located to arrest a card for sensing in interstage positions thereof. When in this position the slide 11 is arrested by cooperation between an adjustable stop 14 and the guide 13. The slide is urged by a spring 15 to the first or normal position thereof, considered lengthwise of the path through which the card is moved to and past the sensing device and in this position a second adjustable stop 16 co-operates with the guide member 12, the card stop 9 then being located to position a card relative to the sensing pins 6 to permit the sensing of normal row positions.

As is shown in Fig. 2, the card stop 9 is interposed in the path through which the cards are moved and is therefore in position to arrest a card for the sensing of the interstage positions thereof. It will be understood that to release the card after sensing the card stop 9 must be retracted and to this end card stop interposing means are provided to move the stop into and out of card arresting positions thereof. The card stop interposing means comprises a cam-operated link 17, Figs. 2 and 4, having an overturned portion 18 forming a platform at the upper end thereof on which rests a roller 19 supported by a bracket 20 secured to the card stop 9 for movement therewith. The link 17 supports a cam roller 21 which co-operates with a cam 22 secured to a shaft 23, the shaft 23 being rotated from the main shaft 24 of the machine by gear wheels 25 and 26, Fig. 2, the ratio between which is 1:1. The link 17 is guided for lengthwise movement by the shaft 23 and by a stub spindle 27 and co-operation between roller 21 and cam 22 is effected by springs 28, Figs. 2 and 5. The card stop 9 is guided during lengthwise movement thereof by flanged rollers 29, Figs. 3 and 5, supported to be freely rotatable on the support 10.

The link 17 has a square abutment 30, Figs. 2 and 4, for co-operation with a similar abutment 31 carried by a rocking member 32 secured to the spindle 27. Also secured to the spindle 27 is an arm 33 having pivoted thereto a link 34 carrying a roller 35, Fig. 2, which co-operates with a cam 36 secured to a shaft 37 rotation of which is effected from the shaft 23 through a shaft 38. The shaft 38 is rotated from shaft 23 by one or other of a pair of gear wheels 39, 40, Fig. 6, each freely rotatable about the shaft 38. The gear wheel 39 meshes with a gear wheel 41 secured to the shaft 23, the ratio between the wheels 39, 41 being 1:1. The gear wheel 40 meshes with a gear wheel 42 on the shaft 23, the ratio between the gear wheels 40, 42 being 1:2. Secured to the shaft 38 is a gear wheel 43, Fig. 3, which meshes with a gear wheel 44 secured to shaft 37. Thus, on rotation of shaft 38, shaft 37 is rotated and the cam 36 moves arm 33 clockwise as viewed in Fig. 2, at a time when the link 17 is in the raised position thereof. Accordingly the abutment 31 is moved by arm 32 into position below abutment 30 and so prevents link 17 from descending, thus ensuring that the card stop 9 remains in the raised position thereof as illustrated in Fig. 2 for a second sensing cycle.

The card stop 9 together with slide 11 is moved to the position thereof shown in Fig. 2 by an actuator comprising a roller 45 carried by an arm 46 free on a spindle 47 and connected by a spring 48 with a lever 49 secured to the spindle 47 and having a laterally extending pin 50 against which the arm 46 is urged by the spring 48. The spindle 47 is rocked by one or other of a pair of arms 51, 52, Fig. 3, respectively carrying cam followers 53, 54 co-operating with cams 55, 56 of which the cam 55 is free on the shaft 38 and cam 56 is secured to shaft 38. On operation of spindle 47 by an arm 51 or 52, the arm 46 and lever 49 are rocked, clockwise as viewed in Fig. 2, to the position thereof shown in Fig. 2, and during this clockwise movement the roller 45 engages the support 10 thereby moving the card stop 9 from the first or normal position thereof in a direction the reverse of that of the direction in which cards are moved through the machine, that is a direction the opposite of that indicated by arrow A, until the adjustable stop 14 arrests the card stop in the position thereof shown in Fig. 2. To ensure proper operation the spindle 47 is rocked beyond the position at which the card stop 9 is arrested by the guide member 13 and during such further movement of the spindle 47, lever 49 moves therewith and extends the spring 48.

The movement of the card stop 9 from the first or normal position thereof to the second position thereof is selectively controlled by a control device which includes the rotatable shaft 38, the cam 55, and a clutch dog 57, Fig. 6, secured to the cam 55 for angular movement therewith. The gear wheel 39 comprises a continually rotatable driving member for the clutch dog 57 and is provided with a single clutch pawl 58 which is pivoted thereto and urged by a spring 59 to the position thereof at which it is positively to co-operate with the clutch dog 57. A first trip plate 60 is secured to a rod 61, the rod 61 being supported by frame members 62 for axial movement and urged by a spring 63, Fig. 3 to the position at which the trip plate 60 positioned to be engaged by the tail 64 of the pawl 58, thereby to trip the pawl and prevent engagement thereof with the clutch dog 57. Accordingly, it will be understood that when the pawl 58 is engaged with clutch dog 57 the cam 55, which is secured to dog 57 for angular movement therewith, will operate during each revolution of the dog 57 to rock spindle 47 and move the card stop 9 to the second position thereof as illustrated in Fig. 2. It will therefore be understood that when the driving member 39 and clutch dog 57 are conditioned for operation the cards will be arrested by the card stop 9 only for sensing in interstage positions. As has been mentioned above, the cam 39 and clutch dog 57 are freely rotatable on shaft 38 and it is therefore necessary to provide a detent device to retain the cam 55 and clutch dog 57 in the starting position thereof. This detent device comprises a detent plate 65 supported for lengthwise movement by the shafts 37 and 38, the plate 65 being urged downwards by a spring 66, Fig. 6, and carrying a detent member 67 to cooperate with a V-shaped groove in a member 68 secured to the cam 55 for rotation therewith.

The control device also includes the second cam 56 which is secured to the shaft 38, and a second clutch dog 69 fixed to the shaft 38. The gear wheel 40 comprises a second driving member and, as stated above, is rotatable at one-half the angular velocity of the first driving member 39. The second driving member formed by the gear wheel 40 has pivoted thereto two equi-spaced clutch pawls 70 urged by springs 71, Fig. 6, to the positions thereof at which they co-operate with the clutch dog 69. A second trip plate 72 is secured to a rod 73 also supported by the frame members 62 for axial movement. A spring 74, Fig. 3, moves the rod 73 to the position thereof at which a lateral projection 75 carried by the trip plate 72 passes through an opening in the frame member 62 and is interposed into the path of the tails 76 of the clutch pawls 70 so that when the tails 76 are engaged by the projecting 75 the pawls 70 are prevented from operatively co-operating with the clutch dog 69. Accordingly, when the driving member 40 is operatively engaged with the clutch dog 69 the shaft 38 is rotated thereby but the angular velocity of shaft 38, at this time, is only one-half that of the shaft 23 and the arrangement is such that the cam 56 becomes operative to effect operation of the actuator 45, 46 only after a card has been arrested by the card stop 9 for sensing in the normal positions thereof and the card is then moved rearwards, that is to the right of Fig. 2, with the stop 9 to the second position of the card stop so that, during the second sensing cycle, the interstage positions of the card are sensed. The cam 56 has secured thereto a detent member 77 having a V-shaped groove formed therein for co-operation with a detent arm 78 pivoted at 79 and urged towards the member 77 by a spring 80.

The trip plate 60 which is secured to rod 61 is also slidable lengthwise of rod 73 which accordingly acts as a guide member for the trip plate 60 during axial movement of rod 61. Similarly the trip plate 72 which is secured to rod 73 is slidably mounted on a rod 81 supported by the frame members 62 and acting as a guide member for the trip plate 72 during axial movement of rod 73. The rods 61 and 73 are selectively operable from a control unit CU, Figs. 1 and 7, provided with two similar manually operable control levers of which one, 82, is shown in Fig. 2, the control lever 82 being that which controls the axial movement of rod 73. As can be seen from Fig. 2, the control lever 82 is pivoted at 83 and comprises a bell crank lever to one arm of which a manually settable lever 84 is pivoted at 85, the lever 84 having an inclined face 86 which co-operates with a stationary cam member 87 so that when the control lever 82 is set to the lowest position thereof, as indicated at 82a, the lever 84 is moved downwards about its pivot 85 thereby operating the inner wire of a Bowden wire 88 and effecting axial movement of the rod 73 to which the inner wire is connected. This movement is effected against the action of spring 74 and moves the projection 75 on trip plate 72 out of the path of the tails 76 of pawls 70 thereby permitting the rotation of shaft 38 by the driving member 40. When the operating lever 82 is moved to the uppermost position thereof, as indicated at 82b, the settable lever 84 is so positioned that the spring 74 restores the rod 73 and the inner wire of the Bowden wire 88.

The control lever for rod 61 is similar to the control lever 82 and has a settable lever 84a, Fig. 7, which operates the inner wire of a second Bowden wire 89 which is connected to the rod 61. This second control lever, however, is provided for use when cards are to be sensed only in the interstage positions thereof and accordingly has only two positions thereof to which it can be set being positions corresponding to the positions 82a and 82b, of which position 82a is the operative position and position 82b is the cut-out or inoperative position.

For co-operation with the settable lever 84 for operating rod 73 is an interponent 90 pivoted on a pin 91, Fig. 2, and having a slot 92 to permit lengthwise movement thereof against the action of a spring 93. In the normal position thereof as indicated in full line in Fig. 2, the interponent 90 is positioned beneath a U-shaped bail 94 pivoted at 95 to frame members of the control unit CU, the bail being connected with an interponent actuator 96 operable by a cam 97 secured to a shaft 98 rotated by any suitable means, not shown, from the main shaft 24. On operation of the actuator 96, the bail 94 is moved downwards thus engaging interponent 90 and moving the interponent downwards so that it engages the settable lever 84 thereby turning the lever about its pivot 85 to effect operation of the inner wire of the Bowden wire 88. The interponent 90 will be operated by bail 94 during each sensing operation unless a sensing pin 6 having a flag 99, Fig. 2, secured thereto is arrested by a card during a sensing operation. If the flag pin is arrested the flag 99 will operate the inner wire 100 of a Bowden wire 101 thereby rocking the interponent 90 about the pin 91 to the chain-line position thereof shown in Fig. 2, in which position the interponent will not be engaged by the bail 94 on downward movement thereof.

When the control lever 82 for rod 73 is in the position 82b thereof it is in its cut-out or inactive position. However, on setting to lever to position 82a thereof the control unit is conditioned so that each card will be sensed first in the normal positions thereof and then in the interstage positions thereof during successive sensing cycles.

It sometimes happens, however, that of a succession of cards fed to the sensing device some require sensing only in normal positions thereof and some in normal and interstage positions thereof. In such circumstances the cards to be sensed in both positions are provided with a control hole in a normal row position to be sensed by the pin carrying flag 99 and the control lever is pre-set to the intermediate position thereof shown in full lines in Fig. 2. Thus when the control hole is sensed during the sensing of the normal positions of a card the wire 88 is operated thereby causing the card stop 9 to be moved to the position thereof shown in Fig. 2 so that the card is retained for a second sensing cycle during which the interstage positions thereof are sensed. On the other hand if the card has no control hole sensed by the flag-carrying pin wire 88 will not be operated and the card will be released by the card stop 9 so that it continues its passage through the machine after only one sensing cycle. A cam 102, Fig. 3, in known manner, is operative to control the card feeding apparatus so that when a card is retained in sensing position for two successive sensing cycles the card feeding apparatus is temporarily interrupted and a new card is not fed to the sensing position until the card stop 9 is operated to release the card already in that position.

It will be understood that when, as described above, a record card is provided with data in normal and interstage positions the data-bearing capacity of the card is doubled. This result is, as is well known in the art, also achieved by the use of a record card the upper half of which, that is the portion of the card containing the first six horizontal row positions, is arranged to receive one set of data indications while the lower half of the card, that is the portion of the card containing the second six horizontal row positions, is arranged to receive a second set of data indications. As is well understood in the art when a card of this kind is employed data is recorded in each of the two halves of the card according to a predetermined code, usually a two-hole code, and it will be further understood that the top half of the card includes the two horizontal row positions, not shown in Fig. 1, sometimes known as the A and B positions, these rows being located in the blank upper portion of the card shown in Fig. 1.

By using a full complement of sensing elements 6 it is possible simultaneously to sense the two halves of a card of the kind to which reference has just been made. In some instances, however, it may be desired to employ a sensing device having sensing elements sufficient only to sense only the upper or the lower half of a card during one sensing operation and in such an instance, it will be understood, successive sensing of the two halves of a card can be effected during a single passage of the card through the machine by using card stop apparatus as described herein but modified, of course, to facilitate the required movement of the card stop along the path of the card through the machine thereby to position either the upper or the lower half of the card relative to the sensing device for sensing by the sensing elements thereof.

I claim:

1. Apparatus for arresting record cards in positions of sensing thereof, comprising a sensing device, a card stop supported for movement into and out of the path of cards and for movement lengthwise of said path, card stop interposing means to move the card stop into and out of a card arresting position thereof, and card stop positioning means selectively operable to position the card stop in a first position therof thereby to arrest a card and locate it relative to the sensing device and thereafter to move the card stop lengthwise of said path in a direction the reverse of that in which the card is moved into engagement with the card stop thereby to locate the card engaged by the card stop in a second position thereof relative to the sensing device.

2. Apparatus according to claim 1, including means co-operating with the card stop to retain it in said first position thereof, and a cam-operated actuator to move the card stop lengthwise of said path to said second position thereof.

3. Apparatus according to claim 2, including stationary guide members to guide the card stop for movement between said first and second positions thereof, a slide co-operating with said guide members, and a support movable with said slide and supporting the card stop for movement therewith relative to said card stop interposing means and for movement relative thereto by said card stop interposing means.

4. Apparatus according to claim 3, wherein the card stop interposing means comprises a cam-operated link having an abutment extending laterally therefrom, and a cam-operated rocking member interposable into the path of said abutment preparatory to operation of said actuator thereby during movement of the card stop from the first to the second card arresting position thereof to retain said link in the position thereof at which the card stop is positioned in said path.

5. Apparatus according to claim 2, wherein the card stop positioning means includes a rotatable shaft, a cam freely rotatable on said shaft to control operation of said actuator, a clutch dog secured to said cam for rotation therewith, a continuously rotatable driving member freely rotatable on said shaft, a clutch pawl pivotally mounted on said driving member for movement therewith and co-operation with the clutch dog, and a trip plate selectively operable for interpolation into the path of the clutch pawl to prevent co-operation of the pawl with said dog.

6. Apparatus according to claim 5, including a second cam secured to said shaft for rotation therewith to control operation of said actuator, a second clutch dog secured to the shaft for rotation therewith, a second driving member freely rotatable on said shaft for continuous rotation at one-half the angular velocity of said first driving member, two equi-spaced clutch pawls pivotally mounted on the second driving member for movement therewith and co-operation with said second dog, and a second trip plate selectively operable for interpolation into the path of said two clutch pawls to prevent cooperation of the pawls with the second dog.

7. Apparatus according to claim 6, including rods axially movable independently one of the other and supporting said first and second trip plates for movement into and out of the paths of said clutch pawls, and springs to retain the rods in the positions thereof at which the trip plates carried thereby are interpolated into the paths of the clutch pawls.

8. Apparatus according to claim 7, including selectively operable rod-conditioning elements co-operating with said rods to move them against the action of said springs to positions at which the trip plates are out of the paths of the clutch pawls.

9. Apparatus according to claim 8, wherein the selectively operable rod-conditioning elements include for each rod a flexible cable and a manually settable lever to effect operation of the cable and axial movement of the rod co-operating therewith.

10. Apparatus according to claim 9, including for the second trip plate an interponent supported for lengthwise movement into and out of co-operation with the settable lever co-operating with the second trip plate to effect axial movement of the supporting rod therefor and for pivotal movement under card control to move it into and out of co-operative relation with its settable lever, and a cam-operated interponent actuator to effect lengthwise movement of the interponent when it is positioned for co-operation with its settable lever thereby to effect movement of the second trip plate out of the path of the clutch pawls co-operating therewith.

11. Apparatus according to claim 10, including stationary guide members to guide the card stop for movement between said first and second positions thereof, a slide co-operating with said guide members, and a support movable with said slide and supporting the card stop for movement therewith relative to said card stop interposing means and for movement relative thereto by said card stop interposing means.

12. Apparatus according to claim 11, wherein the card stop interposing means comprises a cam-operated link having an abutment extending laterally therefrom, and a cam-operated rocking member interposable into the path of said abutment preparatory to operation of said actuator thereby during movement of the card stop from the first to the second card arresting position thereof to retain said link in the position thereof at which the card stop is positioned in said path.

13. Apparatus for arresting record cards in positions of sensing thereof, comprising a sensing device, a card stop supported for movement into and out of the path of cards and for movement lengthwise of said path, card stop interposing means to move the card stop into and out of a card arresting position thereof, card stop positioning means selectively operable to move the card stop lengthwise of said path to a predetermined position thereof relative to the sensing device, and a control unit co-operating with said card stop positioning means and settable manually selectively to control operation of the card stop positioning means.

14. Apparatus according to claim 13, including card-controlled means operable to render ineffective a manual setting of said control unit.

15. Apparatus according to claim 14, wherein the card stop positioning means includes a platform co-operating with the card stop to retain the stop in the card arresting position thereof during movement of the card stop from a first to a second card arresting position thereof during which movement the card stop is operative to move a card lengthwise of said path and in the reverse direction to that in which the card is moved along said path past the sensing device after sensing of the card.

16. Apparatus according to claim 15, including a cam-operated actuator to move the card stop lengthwise of said path from said first to said second card arresting position thereof.

17. Apparatus according to claim 16, wherein the card stop positioning means comprises a cam-operated link supporting said platform, an abutment extending laterally from said link, and a cam-operated rocking member interposable into the path of said abutment preparatory to operation of said actuator.

18. Apparatus according to claim 17, wherein the card stop positioning means includes a rotatable shaft, a cam freely rotatable on said shaft to control operation of said actuator, a clutch dog secured to said cam for rotation therewith, a continuously rotatable driving member freely rotatable on said shaft, a clutch pawl pivotally mounted on said driving member for movement therewith and co-operation with the clutch dog, and a trip plate selectively operable for interpolation into the path of the clutch pawl to prevent co-operation of the pawl with said dog.

19. Apparatus according to claim 18, including a second cam secured to said shaft for rotation therewith to control operation of said actuator, a second clutch dog secured to the shaft for rotation therewith, a second driving member freely rotatable on said shaft for continuous rotation at one-half the angular velocity of said first driving member, two equi-spaced clutch pawls pivotally mounted on the second driving member for movement therewith and co-operation with said second dog, and a second trip plate selectively operable for interpolation into the path of said two clutch pawls to prevent co-operation of the pawls with the second dog.

20. Apparatus according to claim 19, including rods axially movable independently one of the other and supporting said first and second trip plates for movement into and out of the paths of said clutch pawls and springs to retain the rods in the positions thereof at which the trip plates carried thereby are interpolated into the paths of the clutch pawls.

21. Apparatus according to claim 20, wherein the control unit includes selectively operable rod-conditioning elements co-operating with said rods to move them against the action of said springs to positions at which the trip plates are out of the paths of the clutch pawls.

22. Apparatus according to claim 21, wherein the selectively operable rod-conditioning elements include for each rod a flexible cable and a manually settable lever to effect operation of the cable and axial movement of the rod co-operating therewith.

23. Apparatus according to claim 22, including for the second trip plate an interponent supported for lengthwise movement into and out of co-operation with the settable lever co-operating with the second trip plate to effect axial movement of the supporting rod therefor and for pivotal movement under card control to move it into and out of co-operative relation with its settable lever, and a cam-operated interponent actuator to effect lengthwise movement of the interponent when it is positioned for co-operation with its settable lever thereby to effect movement of the second trip plate out of the path of the clutch pawls co-operating therewith.

24. Apparatus according to claim 23, including stationary guide members to guide the card stop for movement between said first and second positions thereof, a slide co-operating with said guide members, and a support movable with said slide and supporting the card stop for movement therewith relative to said card stop interposing means and for movement relative thereto by said card stop interposing means.

References Cited in the file of this patent
UNITED STATES PATENTS

| | | |
|---|---|---|
| 2,027,916 | Lasker | Jan. 14, 1936 |
| 2,324,438 | Thomas et al. | July 13, 1943 |